Nov. 22, 1960

G. A. PETERSEN ET AL 2,961,249

RETRACTABLE WHEELS FOR VEHICLE

Filed Jan. 16, 1959

INVENTORS
Gerald A. Petersen
BY Robert W. Goode

*Julius Caplan*
*attorney*

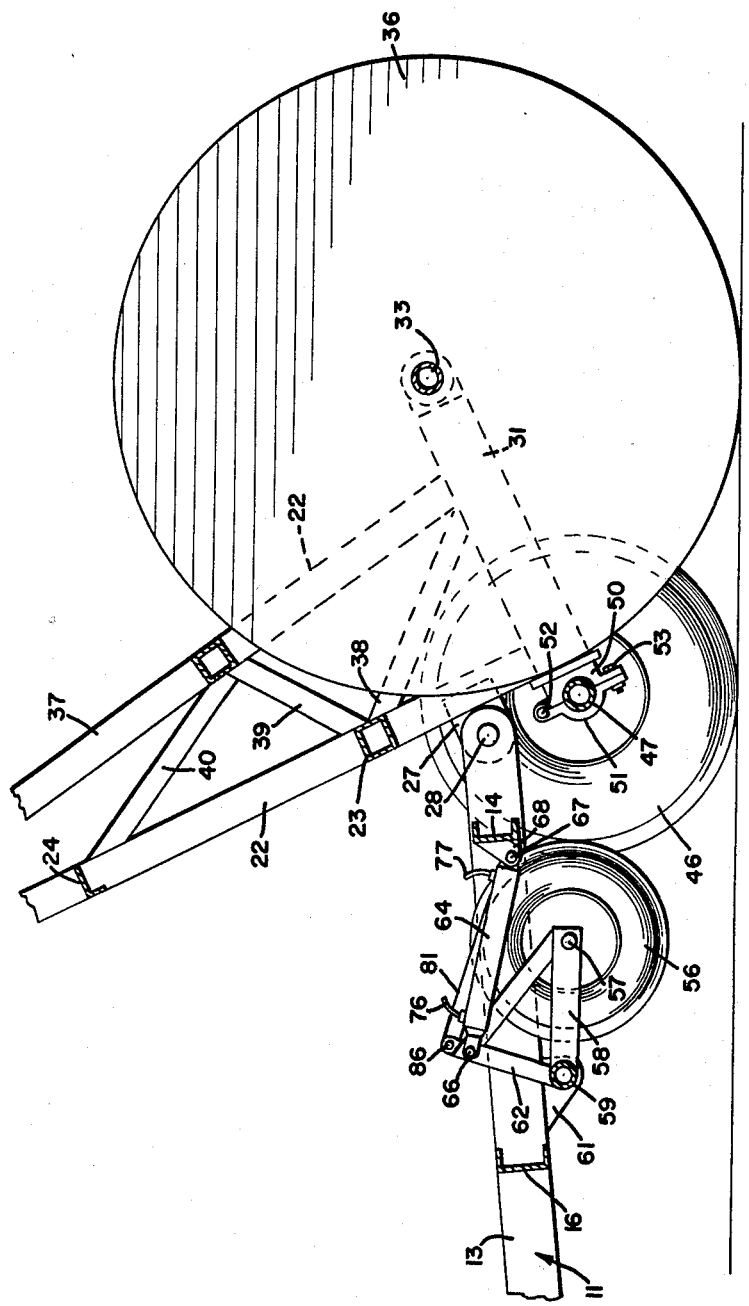

Nov. 22, 1960    G. A. PETERSEN ET AL    2,961,249
RETRACTABLE WHEELS FOR VEHICLE
Filed Jan. 16, 1959    4 Sheets-Sheet 4

INVENTOR.
Gerald A. Petersen
BY Robert W. Goode

Julian Caplan
Attorney

United States Patent Office 2,961,249
Patented Nov. 22, 1960

2,961,249

RETRACTABLE WHEELS FOR VEHICLE

Gerald A. Petersen, Saratoga, Calif., and Robert W. Goode, Morgan Hill, Calif. (both % Petersen Engineering Co., 461 Kifer Road, Santa Clara, Calif.); said Goode assignor to said Petersen Filed Jan. 16, 1959, Ser. No. 787,197

6 Claims. (Cl. 280—34)

This invention relates to a new and improved retractable wheel for vehicles and more particularly relates to a retractable wheel structure for use on a trailer used to transport reels for electric transmission conductors.

At the present time, high tension transmission conductors are transported from the factory to the site at which they are to be strung on large reels. Because of the size of the conductors and the need to wind large lengths on a single reel, the diameter and length of the reels tends to be excessive. It is desirable that the support wheel axle be located directly below the reel axis and this necessitates location of the wheels outside the frame of the carrier. Police regulations frequently limit the width of trailers to eight feet maximum. When it is necessary to move reel carriers along highways, the maximum permissive width of trailers becomes a serious problem.

The present invention relates to a reel carrier structure wherein the support wheels may be removed when the device is transported on a highway and retractable auxiliary wheels, spaced apart a lesser distance than the support wheels, are lowered in their place. Later, when the carrier is being towed over the fields or other places where highway width limitations are not applicable, the support wheels may be reinstalled and the auxiliary wheels retracted.

Accordingly, the present invention provides a convenient, easily operated, simple structure whereby auxiliary wheels may be lowered to operative position and raised to inoperative position as the circumstances require.

A further feature of the invention is the fact that the raising and lowering of the wheels does not interfere with maximum use of the carrier and does not impede tilting of the vehicle subframe to load and unload the reel.

The location of the auxiliary wheels and their mountings do not obstruct use of the reel carrier or in any way limit the size reel which the carrier will accommodate.

Other objects of the present invention will become apparent upon reading the following specification, and referring to the accompanying drawings in which similar characters of reference represent corresponding parts in each of the several views.

In the drawings:

Fig. 3 is a fragmentary side elevation showing the carrier in tilted position.

Fig. 4 is a fragmentary sectional view showing the auxiliary wheels in retracted position.

Figure 1:
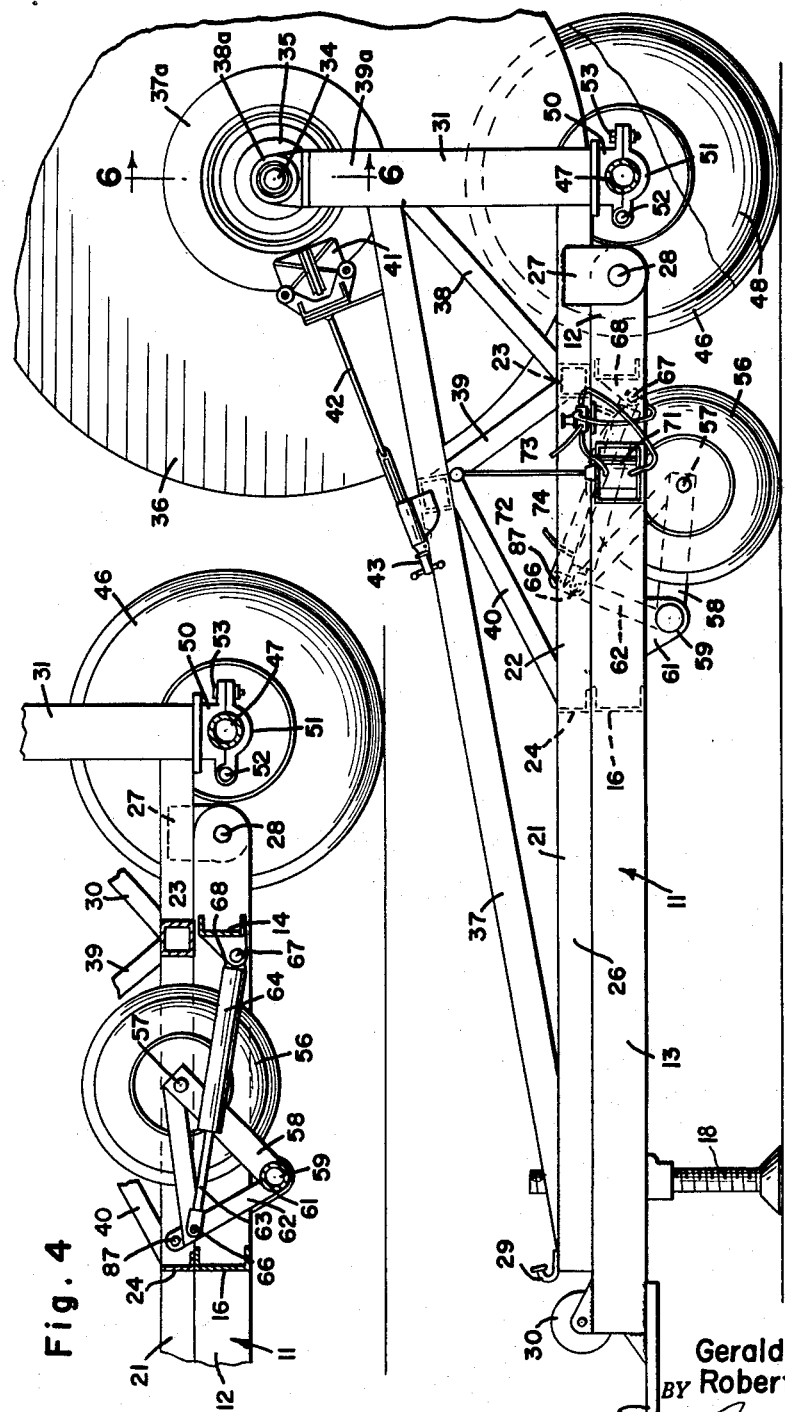
Fig. 1 is a fragmentary side elevational view of the device with the auxiliary wheels in down position.
Figure 2:
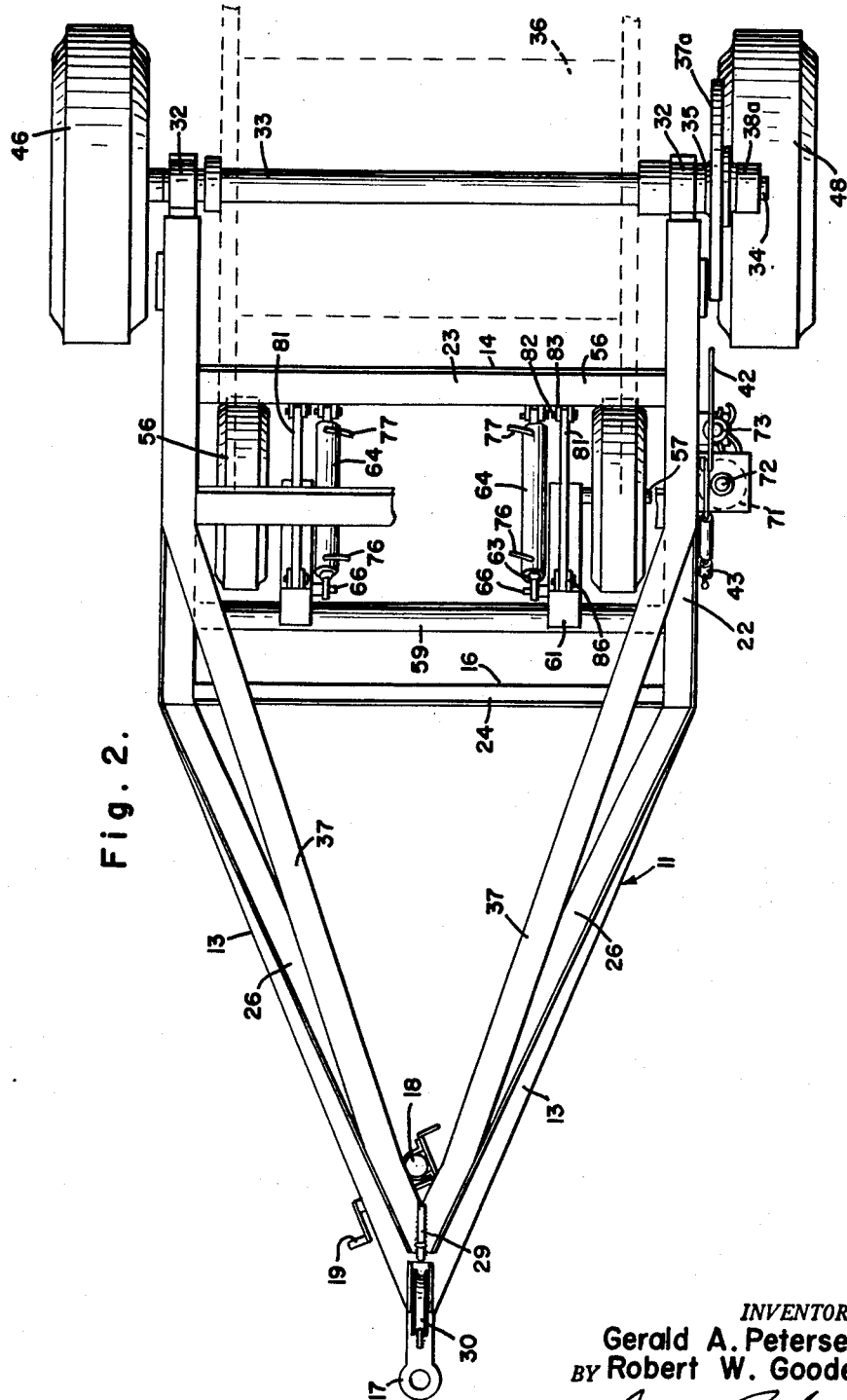
Fig. 2 is a top plan.
Figure 5:
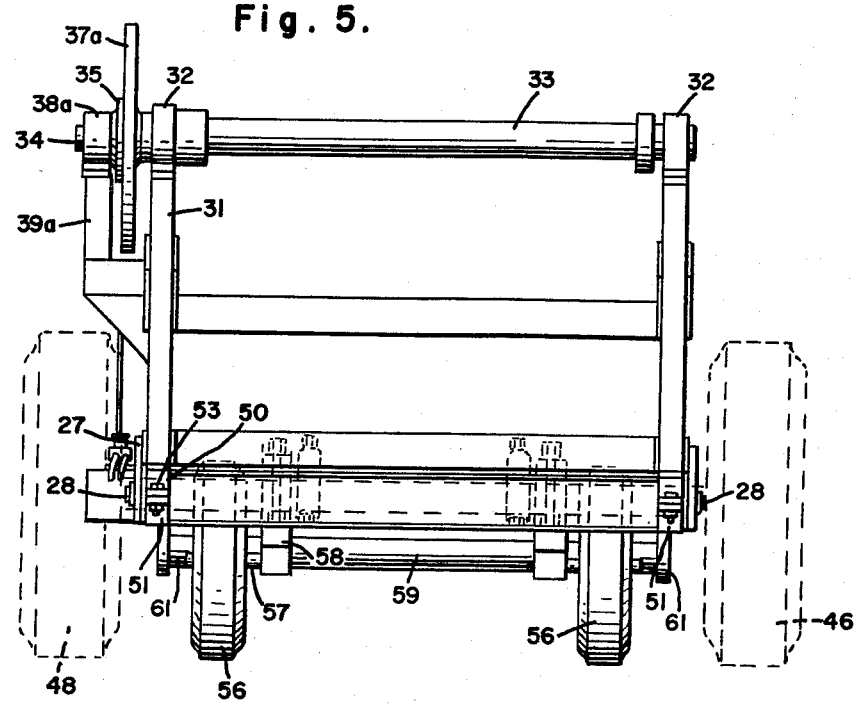
Fig. 5 is a rear end elevation.
Figure 6:
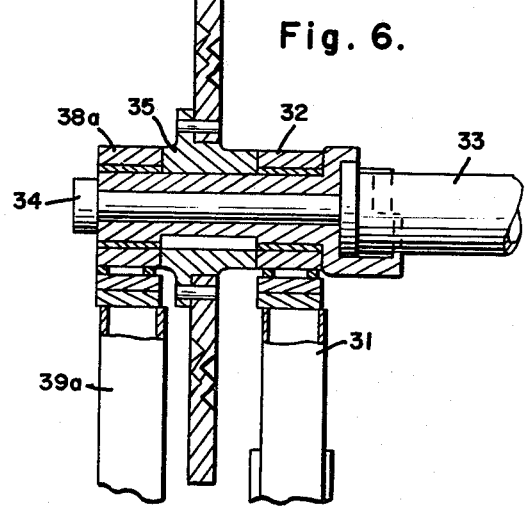
Fig. 6 is a fragmentary vertical sectional view taken substantially along the line 6—6 of Fig. 1.

A conventional reel carrier employs a main frame 11 consisting of side pieces 12 and forwardly converging pieces 13 welded together in a unitary structure and interconnected by crossbars 14 and 16. The forward end of the main frame is provided with a towing eye 17 by means of which the trailer is towed from place to place. At the forward end of the main frame is a lifting jack 18 used to support the forward end of the vehicle when it is stationary. Jack 18 is actuated by handle 19 so that it may be raised and lowered as required.

Mounted on the main frame is a tilt frame 21 having parallel horizontal side pieces 22 interconnected by transverse ties 23 and 24 and having forwardly converging pieces 26 which meet immediately behind the point of juncture of main frame pieces 13. Depending from side pieces 22 are brackets 27 which are pivotly connected to horizontal side pieces 12 of the main frame by pivot pins 28 so that the tilt frame 21 may be tilted relative to the main frame 11. A hook 29 is fastened to the forward end of tilt frame 21 and a pulley 30 to frame 11. By running a towing cable (not shown) from hook 29 under pulley 30 and thence to a tractor, tilt frame 21 may be brought from tilted to horizontal position. Extending upwardly from the ends of tilt frame 21 on either side are posts 31 which carry pillow blocks 32 at their upper ends to receive the spindle 33—34 supporting cable reel 36. Downwardly forwardly extending struts 37 rigidify the assembly and interconnect with the forward end of tilt frame 21. Additional supporting members 38—40 likewise tie the assembly into a strong structure. One end of the spindle 33 is received in a fitting 34 journalled in pillow block 32 and which is keyed to a hub 35 and carries a brake disk 37a. Outside of the hub 35 is a third pillow block 38a supported by means of sub-bracket 39a and journalling fitting 34. Brake disk 37 may be engaged by a brake 41 actuated by brake control rod 42 which connects with the manually operated brake control 43.

Right hand main support wheel 46 is mounted on one end of transverse axle 47 and left hand main wheel 48 is mounted on the opposite end of axle 47. Axle 47 is held in place by split bearing holders 50—51 on the lower ends of posts 31. Movable portion 51 is hinged by hinge 52 to stationary portion 50 and removably held in position by bolt 53. When bolt 53 is removed, portions 50 and 51 may be separated, permitting axle 47 and wheels 46, 48 to be removed. Axle 47 is directly below spindle 33 in order properly to support the weight. It will be observed that the diameter of the wheel 46 and practical consideration as to the permissible height of reel spindle 33 to prevent the structure from being top heavy require that the wheels 46, 48 be located outside of the reel 36 and, in turn, outside of frame 11, and tilt frame 21. Because of the width of reels 36, the main wheels 46, 48 are necessarily spaced apart a width greater than the permissive maximum trailer width as established by law in many localities. Accordingly, the principal feature of the present invention is the fact that the wheels 46, 48 may be removed and auxiliary wheels 56 lowered into place when the carrier is moving over highways where width limitations are in force.

The auxiliary wheels 56 are spaced apart a distance which is well within highway regulations and are positioned inside frame members 12 instead of outside, as is the case with wheels 46, 48. Each auxiliary wheel is mounted on a spindle 57 which is in turn mounted on the end of arm 58, the opposite end of which is fastened by means of pin 59 to extension 61 on main frame 11. A crank 62 is fixed to pivot with arm 58. The piston rod 63 of hydraulic cylinder 64 is pinned by means of pin 66 to crank 62, and the opposite end of cylinder 64 is pinned by means of pin 67 to clevis 68 fastened to transverse member 14. A hand pump 71 for hydraulic fluid actuated by handle 72 is mounted on frame 11. A valve 73 is installed in the line 74 from the pump 71 so that the fluid may be pumped by lines 76—77 into opposite ends of hydraulic cylinder 64 to raise or lower the auxiliary wheels 56 as required. In order to support the auxiliary wheels 56 in down position independently of the hydraulic cylinder 64 a locking bar 81 is pivoted by means of pin 82 to bracket 83 on crossbar 14. The other end of locking bar 81 is received in clevis 86 on crank 62 and secured in place by removable pin 87.

Thus, in use, when the reel 36 is in place and the carrier is hauled over terrain where width limitations are not in force, the auxiliary wheels 56 are retracted. The carrier may be moved about in the usual manner and when it is necessary to load or discharge the reel, the tilt frame is tilted about pivot 28. It will be noted that the axis of pivot 28 is close to that of wheels 48 and hence the tilt frame tilts with only a slight amount of "jackknifing" of frame 21 relative to frame 11. When it is necessary to move the carrier on to highways or other locations where width limitations are of importance, axle 47 and wheels 46 and 48 are removed by removing bolts 53 and opening portions 50, 51 by hinge 52. Preliminary to such removal, the hand lever 72 is actuated and valve 73 adjusted to depress auxiliary wheels 56 so that they support the carrier and thereupon locking bar 81 is installed in place. After the main wheels are replaced, locking bar 81 is removed, the setting of valve 73 changed and pump 71 actuated to retract the wheels to inoperative position.

When the carrier is positioned a considerable distance from the closest transmission tower, there is sometimes a length of unused cable which may be rewound on reel 36. For such purpose an engine may be located on the carrier and suitably connected to reel spindle 33 to turn the same.

Although the foregoing invention has been described in some detail, by way of illustration and example for purposes of clarity of understanding, it is understood that certain changes and modifications may be practiced within the spirit of the invention and scope of the appended claims.

What is claimed:

1. A reel carrier comprising a frame, reel support means on said frame, removable support wheels mounted on the outside of said frame substantially directly below said reel support means, a pair of auxiliary wheels within said frame displaced forwardly of said support wheels and forward and below the space occupied by a reel mounted on support means and retractable means mounting said auxiliary wheels on said frame for raising said auxiliary wheels to inoperative position and lowering said auxiliary wheels to support position, said retractable means being pivoted to said frame about an axis forward of said auxiliary wheels, whereby said auxiliary wheels are moved toward said support wheels when said auxiliary wheels are lowered.

2. A reel carrier comprising a frame, reel support means on said frame, removable support wheels mounted on the outside of said frame substantially directly below said reel support means, a pair of auxiliary wheels within said frame displaced forwardly of said support wheels and forward and below the space occupied by a reel mounted on support means, arms on which said auxiliary wheels are mounted, means pivotally mounting said arms on said frame about an axis forward of said auxiliary wheels, and means for pivoting said arms from a position where said auxiliary wheels are raised to an operative position where said auxiliary wheels are lowered to support position, said lowered position being rearward of said raised position.

3. A reel carrier comprising a frame, reel support means on said frame, removable support wheels mounted on the outside of said frame substantially directly below said reel support means, a pair of auxiliary wheels within said frame displaced forwardly of said support wheels and forward and below the space occupied by a reel mounted on support means, arms on which said auxiliary wheels are mounted, means pivotally mounting said arms on said frame about an axis forward of said auxiliary wheels, hydraulic cylinders mounted on said frame and articulately connected to said arms for pivoting said arms from a position where said auxiliary wheels are raised to an operative position when said auxiliary wheels are lowered to support position, said lowered position being rearward of said raised position and means for energizing said cylinders.

4. A carrier according to claim 3 which further comprises a locking bar pivotally mounted on said frame, and detachable means articulately connecting said bar to at least one of said arms to support said auxiliary wheels in operative position independently of said hydraulic cylinders.

5. A carrier according to claim 3 in which said last-mentioned means comprises a manually actuated pump.

6. A reel carrier comprising a frame, reel support means on said frame, an axle mounted in said frame directly below said support means, support wheels on said axle located outside said frame and removable from said axle, auxiliary wheels within said frame located displaced forwardly of said support wheels and forward and below the space occupied by a reel mounted on said support means, arms on which said auxiliary wheels are mounted, means pivotally mounting said arms on said frame about an axis forward of said auxiliary wheels, and means for pivoting said arms from a position where said auxiliary wheels are raised to an operative position where said auxiliary wheels are lowered to support position, said lowered position being rearward of said raised position.

References Cited in the file of this patent

UNITED STATES PATENTS

| 2,126,083 | Bailey | Aug. 9, 1938 |
| 2,348,445 | Bayer | May 9, 1944 |
| 2,478,653 | Callan | Aug. 9, 1949 |
| 2,486,409 | Holmes | Nov. 1, 1949 |
| 2,620,201 | Brady | Dec. 2, 1952 |

FOREIGN PATENTS

| 752,161 | Great Britain | July 4, 1956 |